US012698735B2

(12) United States Patent
Kramer et al.

(10) Patent No.: US 12,698,735 B2
(45) Date of Patent: Aug. 4, 2026

(54) INTRODUCING STEAM INTO CORE AIR UPSTREAM OF TURBINE ENGINE DIFFUSER PLENUM

(71) Applicant: Raytheon Technologies Corporation, Farmington, CT (US)

(72) Inventors: Stephen K. Kramer, Cromwell, CT (US); Lance L Smith, West Hartford, CT (US); Zhongtao Dai, West Hartford, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/121,504

(22) Filed: Mar. 14, 2023

(65) Prior Publication Data

US 2024/0309810 A1     Sep. 19, 2024

(51) Int. Cl.
*F02C 3/30* (2006.01)

(52) U.S. Cl.
CPC .......... *F02C 3/30* (2013.01); *F05D 2220/323* (2013.01); *F05D 2240/12* (2013.01); *F05D 2260/60* (2013.01)

(58) Field of Classification Search
CPC ........ F02C 3/30; F02C 3/305; F05D 2240/12; F05D 2220/323; F05D 2260/60; F01D 9/065
See application file for complete search history.

(56) References Cited

U.S. PATENT DOCUMENTS

| | | | |
|---|---|---|---|
| 4,934,632 A | 6/1990 | Kim | |
| 5,054,279 A | 10/1991 | Hines | |
| 5,239,816 A | 8/1993 | Holt, III | |
| 5,340,274 A | 8/1994 | Cunha | |
| 5,697,209 A | 12/1997 | Wettstein | |
| 5,980,202 A * | 11/1999 | Tomita | F01D 11/02 |
| | | | 415/114 |
| 6,142,730 A * | 11/2000 | Tomita | F01D 5/187 |
| | | | 415/114 |
| 6,468,031 B1 * | 10/2002 | Yu | F01D 9/06 |
| | | | 415/114 |
| 7,040,097 B2 | 5/2006 | Mukherjee | |
| 9,334,803 B2 | 5/2016 | Intile | |
| 2009/0208332 A1 * | 8/2009 | Weinstein | F01D 25/246 |
| | | | 415/209.3 |

(Continued)

FOREIGN PATENT DOCUMENTS

DE          10205972 A1    10/2003

OTHER PUBLICATIONS

EP search report for EP24163618.2 dated Jul. 24, 2024.

*Primary Examiner* — Rodolphe Andre Chabreyrie
(74) *Attorney, Agent, or Firm* — Getz Balich LLC

(57) ABSTRACT

An aircraft propulsion system is provided that include a propulsor rotor, a turbine engine core and a steam system. The turbine engine core is configured to power the propulsor rotor. The turbine engine core includes a core flowpath, a compressor section, a combustor section and a turbine section. The core flowpath extends through the compressor section, the combustor section and the turbine section from a flowpath inlet to a flowpath exhaust. The combustor section includes a diffuser plenum and a combustor disposed within the diffuser plenum. The steam system is configured to introduce steam into the core flowpath upstream of the diffuser plenum.

19 Claims, 14 Drawing Sheets

(56)  References Cited

U.S. PATENT DOCUMENTS

| | | | |
|---|---|---|---|
| 2011/0185699 A1* | 8/2011 | Danis | F23R 3/50 |
| | | | 60/39.55 |
| 2018/0163629 A1* | 6/2018 | Proscia | F23N 1/002 |
| 2020/0256250 A1* | 8/2020 | Wedderburn | F02C 7/18 |
| 2021/0207500 A1* | 7/2021 | Klingels | F02C 3/305 |
| 2022/0018260 A1* | 1/2022 | Mongillo, Jr. | F23R 3/002 |

* cited by examiner

INTRODUCING STEAM INTO CORE AIR UPSTREAM OF TURBINE ENGINE DIFFUSER PLENUM

BACKGROUND OF THE DISCLOSURE

1. Technical Field

This disclosure relates generally to a turbine engine and, more particularly, to utilizing steam during operation of the turbine engine.

2. Background Information

As government emissions standards tighten, interest in alternative fuels for gas turbine engines continues to grow. There is interest, for example, in fueling a gas turbine engine with hydrogen ($H_2$) fuel rather than a traditional hydrocarbon fuel such as kerosine to reduce greenhouse emissions. Combustion products produced by combusting hydrogen ($H_2$) fuel include water vapor. Various systems and methods are known in the art for recovering the water vapor. Various system and methods are also known in the art for producing and utilizing steam from the recovered water vapor. While these known systems and methods have various advantages, there is still room in the art for improvement.

SUMMARY OF THE DISCLOSURE

According to an aspect of the present disclosure, an aircraft propulsion system is provided that include a propulsor rotor, a turbine engine core and a steam system. The turbine engine core is configured to power the propulsor rotor. The turbine engine core includes a core flowpath, a compressor section, a combustor section and a turbine section. The core flowpath extends through the compressor section, the combustor section and the turbine section from a flowpath inlet to a flowpath exhaust. The combustor section includes a diffuser plenum and a combustor disposed within the diffuser plenum. The steam system is configured to introduce steam into the core flowpath upstream of the diffuser plenum.

According to another aspect of the present disclosure, an assembly is provided for a turbine engine. This assembly includes a turbine engine core and a steam system. The turbine engine core includes a core flowpath, a compressor section, a combustor section and a turbine section. The core flowpath extends through the compressor section, the combustor section and the turbine section from a flowpath inlet to a flowpath exhaust. The combustor section includes a diffuser plenum and a combustor disposed within the diffuser plenum. The turbine engine core also include a vane array structure. The core flowpath extends through the vane array structure towards the diffuser plenum. The vane array structure includes a plurality of vanes arranged circumferentially about a centerline. Each of the vanes extends across the core flowpath, and the vanes include a first vane. The first vane extends longitudinally between a leading end and a trailing end. The first vane extends laterally between a first side and a second side. The steam system includes a first steam outlet arranged along the first side. The steam system is configured to inject steam into the core flowpath through the first outlet.

According to still another aspect of the present disclosure, an assembly is provided for a turbine engine. This assembly includes a turbine engine core and a steam system. The turbine engine core includes a compressor section, a combustor section, a turbine section and a core flowpath. The combustor section includes a diffuser plenum and a combustor disposed within the diffuser plenum. The core flowpath extends through the compressor section, the combustor section and the turbine section from a flowpath inlet to a flowpath exhaust. A peripheral boundary of the core flowpath upstream of the diffuser plenum is formed by a flowpath wall. The flowpath wall extends circumferentially about and axially along a centerline. The flowpath wall includes a first section, a second section and an intermediate section extending radially between the first section and the second section. The first section extends axially to the intermediate section. The second section extends axially from the intermediate section. The steam system includes a plurality of steam outlets arranged along the intermediate section. The steam system is configured to inject steam into the core flowpath through the steam outlets.

The steam system may also include a second steam outlet arranged along the second side. The steam system may be configured to further inject the steam into the core flowpath through the second steam outlet.

The steam system may be configured to introduce the steam into the core flowpath downstream of the compressor section.

The steam system may be configured to introduce the steam into the core flowpath at an inlet to the diffuser plenum.

The turbine engine core may also include a vane array structure. The core flowpath may extend through the vane array structure to the diffuser plenum. The vane array structure may include a plurality of vanes arranged circumferentially about a centerline. Each of the vanes may extend across the core flowpath, and the vanes may include a first vane. The steam system may include a first steam outlet configured with the first vane. The steam system may be configured to introduce the steam into the core flowpath through the first steam outlet.

The first vane may extend longitudinally between a leading end and a trailing end. The first vane may extend laterally between a first side and a second side. The first steam outlet may be arranged at the trailing end.

The steam system may also include a second steam outlet arranged at the trailing end. The steam system may be configured to further introduce the steam into the core flowpath through the second steam outlet.

The steam system may also include a second steam outlet arranged along the first side. The steam system may be configured to further introduce the steam into the core flowpath through the second steam outlet.

The steam system may also include a third steam outlet arranged along the second side. The steam system may be configured to further introduce the steam into the core flowpath through the third steam outlet.

The first vane may extend longitudinally between a leading end and a trailing end. The first vane may extend laterally between a first side and a second side. The first steam outlet may be arranged at the first side.

The steam system may also include a second steam outlet arranged at the first side. The steam system may be configured to further introduce the steam into the core flowpath through the second steam outlet.

The steam system may also include a second steam outlet arranged at the second side. The steam system may be configured to further introduce the steam into the core flowpath through the second steam outlet.

The vane array structure may also include an inner wall and an outer wall. Each of the vanes may extend radially between and may be connected to the inner wall and the outer wall. The inner wall may form an inner peripheral boundary of the core flowpath through the vane array structure. The outer wall may form an outer peripheral boundary of the core flowpath through the vane array structure. The core flowpath may radially expand as the core flowpath extends within the vane array structure towards the diffuser plenum.

The steam system may also include a steam passage extending within the first vane. The first steam outlet may extend through a sidewall of the first vane from the steam passage to the core flowpath.

A second passage may extend within the first vane. The second passage may be fluidly decoupled from the steam passage.

The second passage may be configured as or otherwise include a lubricant passage or an air passage.

The turbine engine core may also include a flowpath wall. The flowpath wall may extend circumferentially about and axially along a centerline. The flowpath wall may form a peripheral boundary of the core flowpath upstream of the diffuser plenum. The steam system may include a first steam outlet configured with the flowpath wall. The steam system may be configured to introduce the steam into the core flowpath through the first steam outlet.

The flowpath wall may include a first section, a second section and an intermediate section extending radially between the first section and the second section. The first section may extend axially to the intermediate section. The second section may extend axially from the intermediate section. The first steam outlet may be arranged with the intermediate section.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
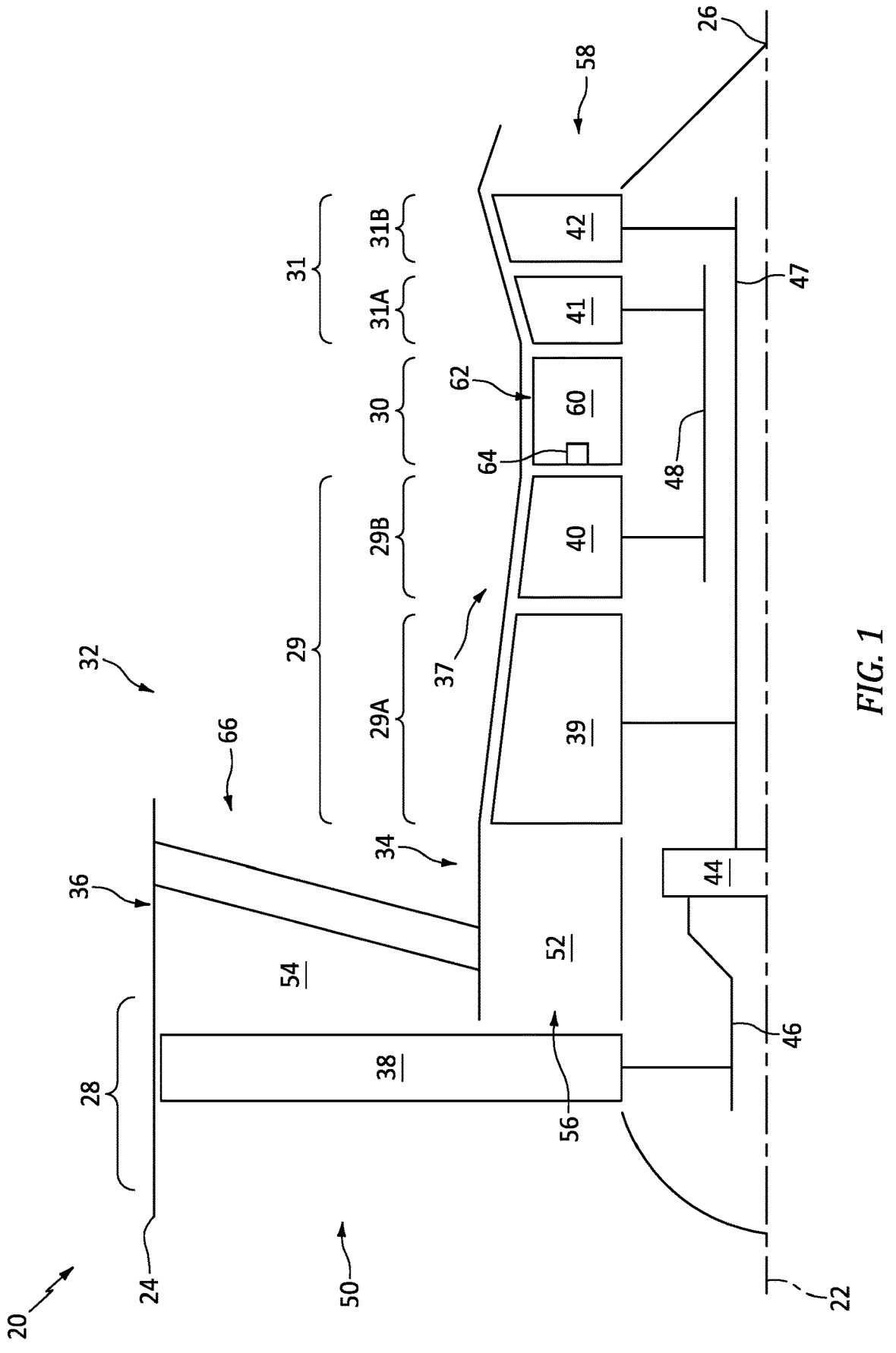
FIG. 1 is a partial schematic illustration of a gas turbine engine.

FIG. 1 is a side sectional illustration of a gas turbine engine 20 for a propulsion system of an aircraft. For ease of description, the aircraft propulsion system and its turbine engine 20 may be described below for an airplane application. The aircraft propulsion system and the turbine engine 20 of the present disclosure, however, may alternatively be implemented with various other types and configurations manned or unmanned aerial vehicles.

The turbine engine 20 of FIG. 1 extends axially along an axial centerline 22 between a forward, upstream end 24 and an aft, downstream end 26. The turbine engine 20 includes a fan section 28, a compressor section 29, a combustor section 30 and a turbine section 31. The compressor section 29 of FIG. 1 includes a low pressure compressor (LPC) section 29A and a high pressure compressor (HPC) section 29B. The turbine section 31 of FIG. 1 includes a high pressure turbine (HPT) section 31A and a low pressure turbine (LPT) section 31B.

The engine sections 28-31B of FIG. 1 are arranged sequentially along the axial centerline 22 within an engine housing 32. This engine housing 32 includes an inner case 34 (e.g., a core case) and an outer case 36 (e.g., a fan case). The inner case 34 may house one or more of the engine sections 29A-31B; e.g., a core 37 of the turbine engine 20. The outer case 36 may house at least the fan section 28.

Each of the engine sections 28, 29A, 29B, 31A and 31B includes a respective bladed rotor 38-42. Each of these bladed rotors 38-42 includes a plurality of rotor blades arranged circumferentially around and connected to one or more respective rotor disks and/or hubs. The rotor blades, for example, may be formed integral with or mechanically fastened, welded, brazed, adhered and/or otherwise attached to the respective rotor disk(s) and/or the respective hub(s).

The fan rotor 38 is connected to a geartrain 44, for example, through a fan shaft 46. The geartrain 44 and the LPC rotor 39 are connected to and driven by the LPT rotor 42 through a low speed shaft 47. The HPC rotor 40 is connected to and driven by the HPT rotor 41 through a high speed shaft 48. The engine shafts 46-48 are rotatably supported by a plurality of bearings; e.g., rolling element and/or thrust bearings. Each of these bearings is connected to the engine housing 32 by at least one stationary structure such as, for example, an annular support strut.

During engine operation, air enters the turbine engine 20 through an airflow inlet 50 into the turbine engine 20. This air is directed through the fan section 28 and into a core flowpath 52 and a bypass flowpath 54. The core flowpath 52 extends sequentially through the engine sections 29A-31B (e.g., the engine core 37) from an inlet 56 into the core flowpath 52 to an exhaust 58 from the core flowpath 52. The air within the core flowpath 52 may be referred to as "core air". The bypass flowpath 54 extends through a bypass duct, and bypasses the engine core 37. The air within the bypass flowpath 54 may be referred to as "bypass air".

The core air is compressed by the LPC rotor 39 and the HPC rotor 40 and directed into a (e.g., annular) combustion chamber 60 of a (e.g., annular) combustor 62 in the combustor section 30. Fuel is injected by one or more fuel injector assemblies 64 (one visible in FIG. 1) into the combustion chamber 60 and mixed with the compressed core air to provide a fuel-air mixture. This fuel-air mixture is ignited and combustion products thereof flow through and sequentially cause the HPT rotor 41 and the LPT rotor 42 to rotate before being directed out of the turbine engine 20 through the core exhaust 58. The rotation of the HPT rotor 41 and the LPT rotor 42 respectively drive rotation of the HPC rotor 40 and the LPC rotor 39 and, thus, compression of the air received from the core inlet 56. The rotation of the LPT rotor 42 also drives rotation of the fan rotor 38, which propels the bypass air through the bypass flowpath 54 and out of the turbine engine 20 through an exhaust 66 from the bypass flowpath 54. The propulsion of the bypass air may account for a majority of thrust generated by the turbine engine 20.

Figure 2:
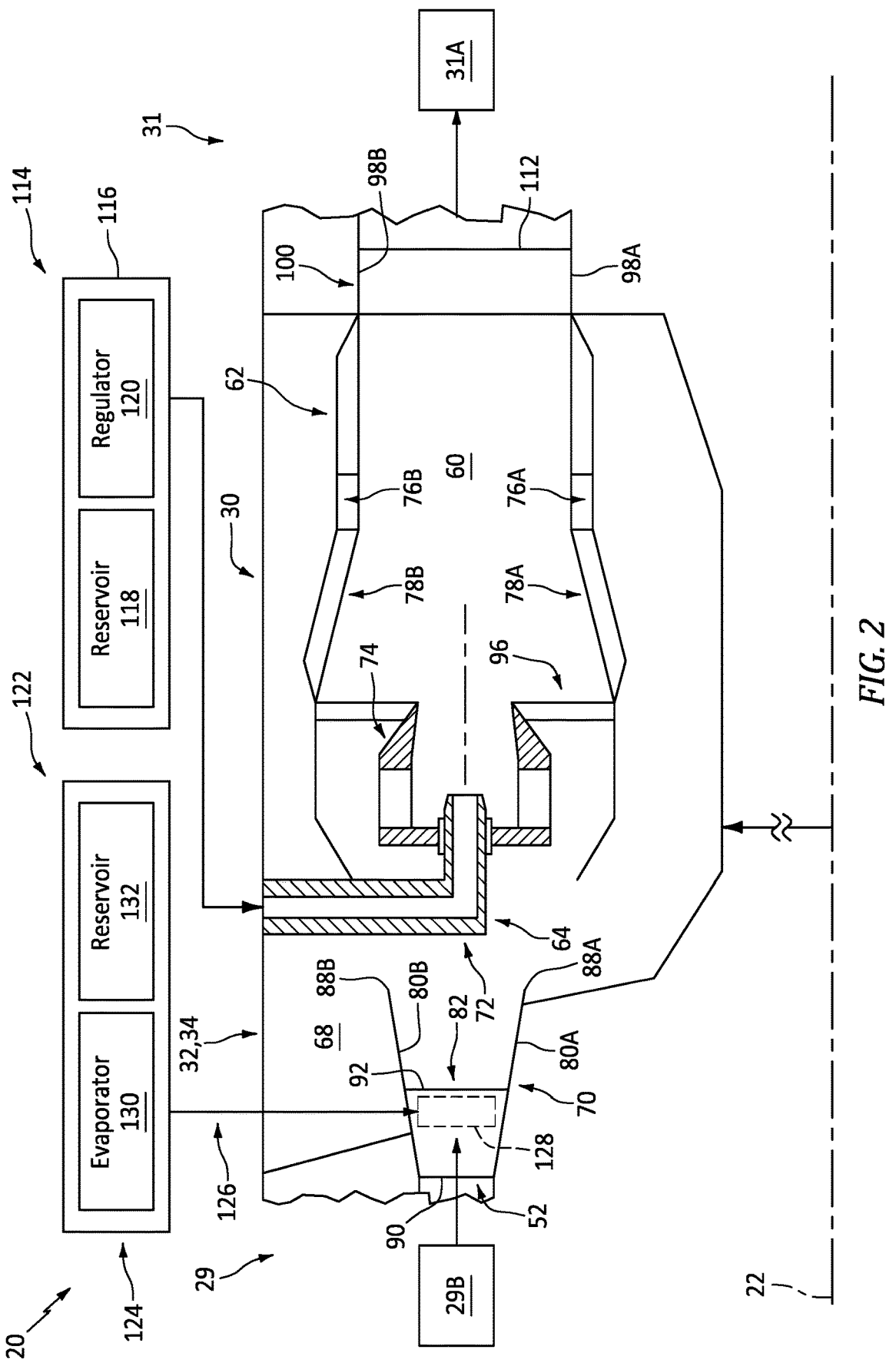
FIG. 2 is a partial schematic illustration of a combustor section between a compressor section and a turbine section.

FIG. 2 illustrate a portion of the combustor section 30 along the core flowpath 52 between the HPC section 29B and the HPT section 31A. This combustor section 30 includes the combustor 62, a diffuser plenum 68 and the one or more injector assemblies 64. Briefly, the combustor 62 is disposed within (e.g., surrounded by) the diffuser plenum 68-*a* compressed air plenum. This diffuser plenum 68 is formed by and/or within the engine housing 32 and its inner case 34. The diffuser plenum 68 receives the compressed core air from the HPC section 29B through a vane array structure 70 (e.g., a pre-diffuser structure) for subsequent provision into the combustion chamber 60. Each injector assembly 64 of FIG. 2 includes a fuel injector 72 mated with an air swirler structure 74. The fuel injector 72 injects the fuel into the combustion chamber 60. The air swirler structure 74 directs some of the core air from the diffuser plenum 68 into the combustion chamber 60 in a manner that facilitates mixing the core air with the injected fuel. One or more igniters (not shown) ignite the fuel-air mixture within the combustion chamber 60. One or more quench apertures 76A, 76B (generally referred to as "76") (e.g., dilution holes) in each wall 78A, 78B (generally referred to as "78") of the combustor 62 direct additional core air from the diffuser plenum 68 into the combustion chamber 60 to facilitate substantially complete burnout of (e.g., make stoichiometrically lean) the combustion products; e.g., the ignited fuel-air mixture.

The vane array structure 70 may be configured as a pre-diffuser structure. The vane array structure 70 of FIG. 2, for example, is disposed along the core flowpath 52 between the HPC section 29B and the diffuser plenum 68. More particularly, the vane array structure 70 may be disposed at an inlet into the diffuser plenum 68 at (e.g., on, adjacent or proximate) an upstream end of the diffuser plenum 68. This vane array structure 70 includes an inner flowpath wall 80A ("inner wall"), an outer flowpath wall 80B ("outer wall") and a plurality of stator vanes 82 (e.g., pre-diffuser struts).

Figure 3:
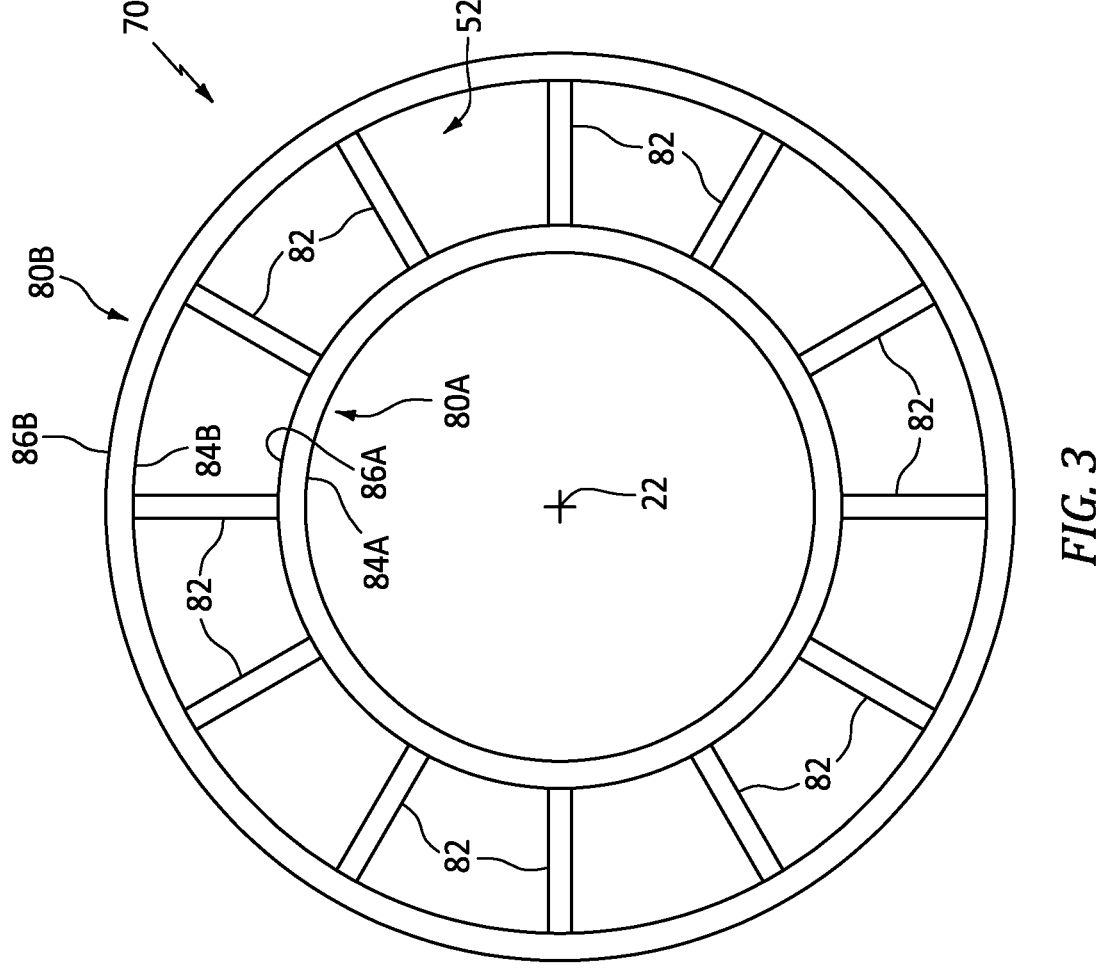
FIG. 3 is a schematic illustration of an end of a vane array structure.
Figure 4:
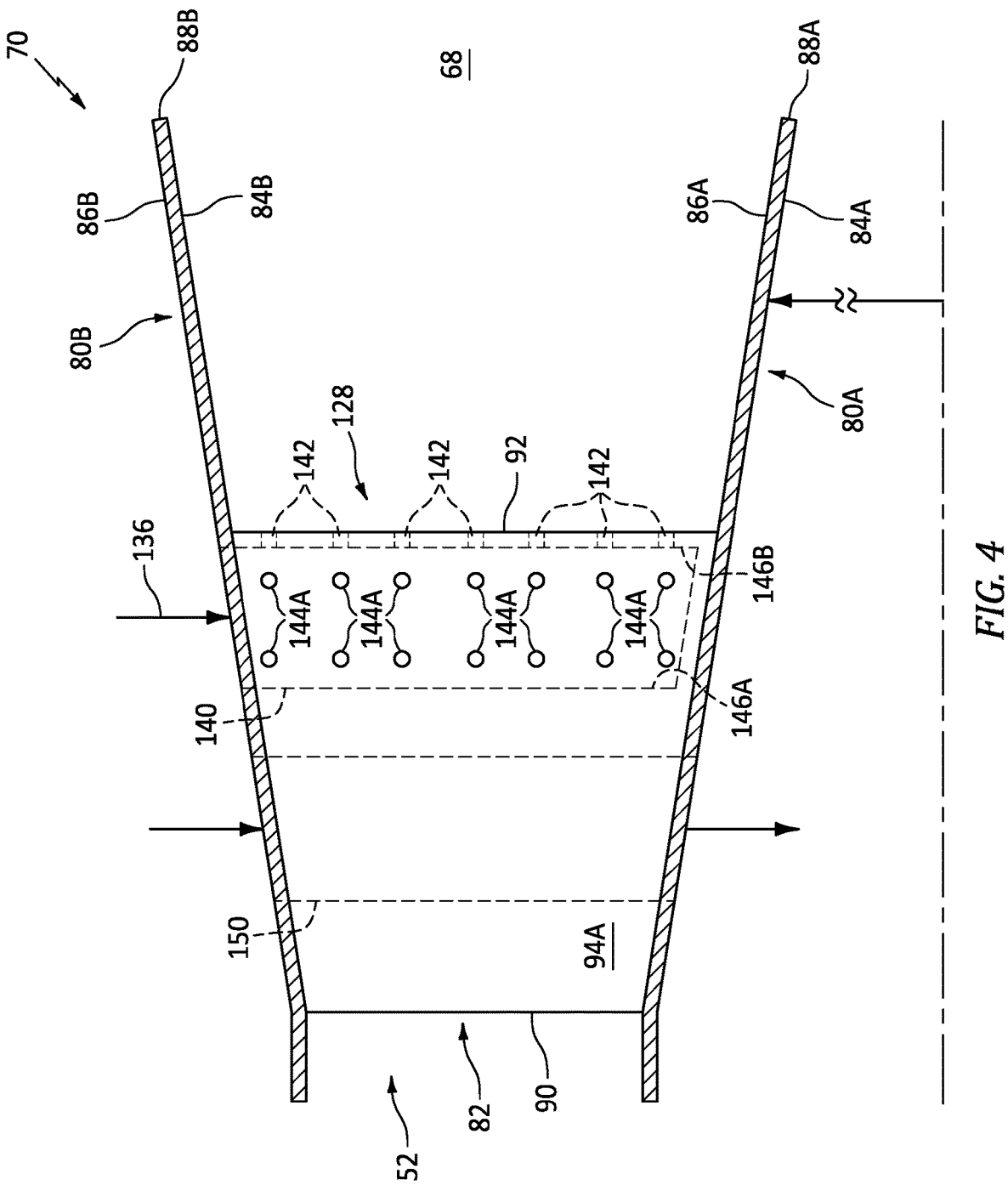
FIG. 4 is a partial sectional illustration of the vane array structure configured with a steam injector.

Referring to FIG. 3, the inner wall 80A is a platform/shroud that extends circumferentially about (e.g., completely around) the axial centerline 22, which axial centerline 22 may also be an axial centerline of the inner wall 80A. The inner wall 80A extends radially between and to an inner side 84A of the inner wall 80A and an outer side 86A of the inner wall 80A. Referring to FIG. 4, at the inner flowpath wall outer side 86A, the inner wall 80A forms a radial inner peripheral boundary of the core flowpath 52 longitudinally within (and through) the vane array structure 70. The inner wall 80A extends longitudinally along the core flowpath 52 (e.g., axially along the axial centerline 22) to a downstream end 88A of the inner wall 80A.

Referring to FIG. 3, the outer wall 80B is a platform/shroud that extends circumferentially about (e.g., completely around) the axial centerline 22, which axial centerline 22 may also be an axial centerline of the outer wall 80B. The outer wall 80B extends radially between and to an inner side 84B of the outer wall 80B and an outer side 86B of the outer wall 80B. Referring to FIG. 4, at the outer flowpath wall inner side 84B, the outer wall 80B forms a radial outer peripheral boundary of the core flowpath 52 longitudinally within (and through) the vane array structure 70. The outer wall 80B extends longitudinally along the core flowpath 52

(e.g., axially along the axial centerline 22) to a downstream end 88B of the outer wall 80B.

The outer wall 80B of FIG. 4 is spaced radially outboard of the inner wall 80A. The outer wall 80B is longitudinally aligned with and/or longitudinally (e.g., axially) overlaps at least a portion or an entirety of the inner wall 80A, and vice versa. A (e.g., radial) distance between the inner wall 80A and the outer wall 80B may change (e.g., increase) as the core flowpath 52 extends within (e.g., through) at least a portion or an entirety of the vane array structure 70. The core flowpath 52 of FIG. 4, for example, radially expands as the core flowpath 52 extends through the vane array structure 70 towards the diffuser plenum 68; e.g., to the flowpath wall downstream ends 88A and 88B (generally referred to as "88"). Referring to FIG. 3, the outer wall 80B circumscribes the inner wall 80A. With this arrangement, the core flowpath 52 may have an annular geometry when viewed, for example, in a first reference plane perpendicular to the axial centerline 22.

The stator vanes 82 of FIG. 3 are distributed circumferentially about the axial centerline 22 in a (e.g., circular) array, which axial centerline 22 may also be an axial centerline of the array of stator vanes 82. The stator vanes 82 are arranged within the core flowpath 52. Each stator vane 82 of FIG. 4, for example, extends (e.g., radially) between and to the inner wall 80A and the outer wall 80B. Each stator vane 82 is also connected to (e.g., formed integral with or otherwise fixedly attached to) the inner wall 80A and/or the outer wall 80B. With this arrangement, each stator vane 82 extends (e.g., generally radially) across the core flowpath 52 from the inner wall 80A to the outer wall 80B.

Figure 5:
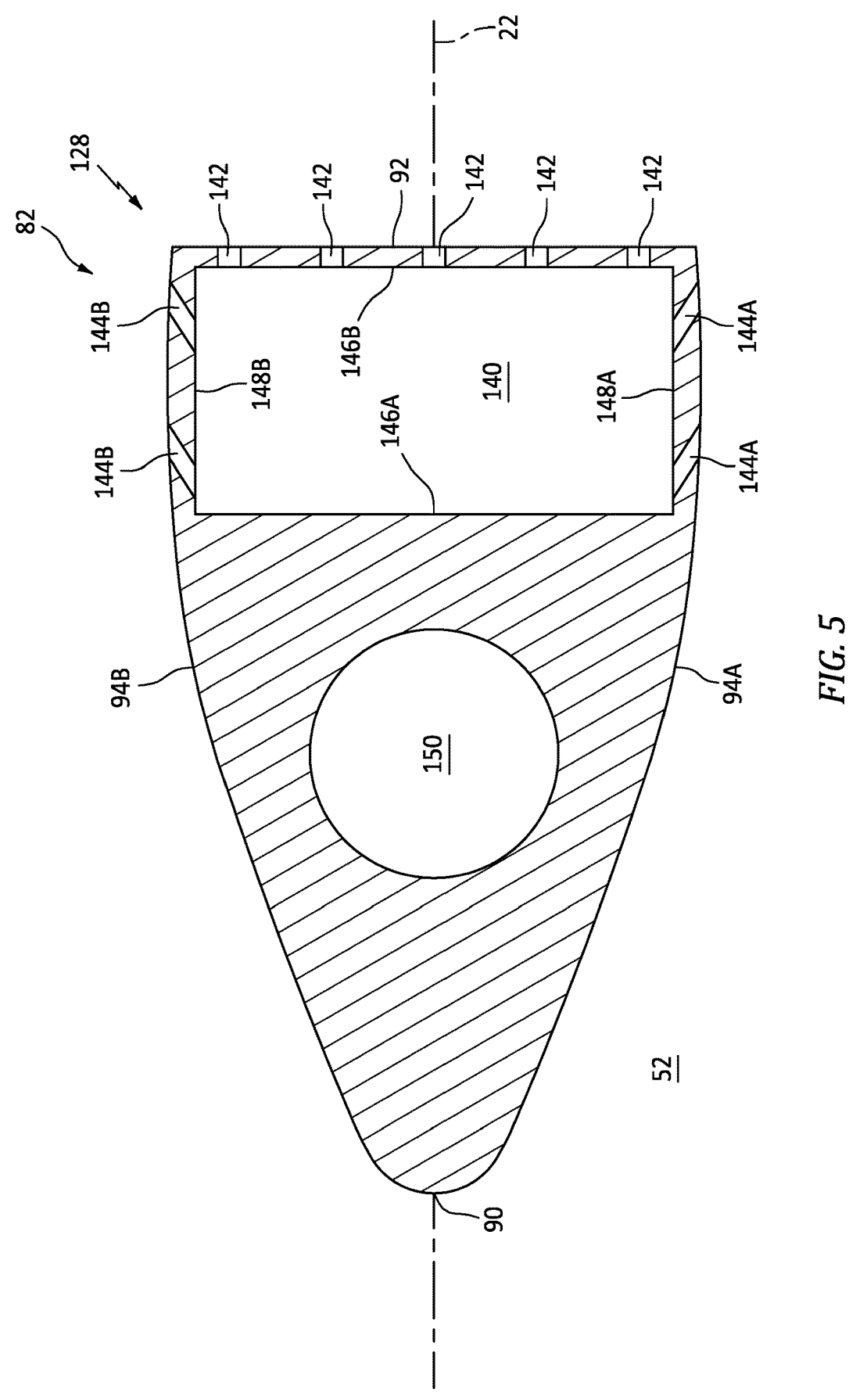
FIG. 5 is a cross-sectional illustration through a stator vane configured with the steam injector.

Each stator vane 82 of FIG. 4 extends spanwise (e.g., radially) between and to the inner flowpath wall outer side 86A and the outer flowpath wall inner side 84B. Referring to FIG. 5, each stator vane 82 extends longitudinally (e.g., chordwise, axially) between and to a leading end 90 of the respective stator vane 82 and a (e.g., bluff) trailing end 92 of the respective stator vane 82. Each stator vane 82 extends laterally (e.g., circumferentially) between and to opposing lateral sides 94A and 94B (generally referred to as "94") of the respective stator vane 82. These vane sides 94 may meet at the vane leading end 90 configuring the vane leading end 90 as a leading edge of the respective stator vane 82. Each of the vane sides 94 extends longitudinally from the vane leading end 90 to the vane trailing end 92 and, more particularly, a respective lateral side of the vane trailing end 92. With this arrangement, the vane trailing end 92 extends laterally between and to the vane sides 94 providing the respective stator vane 82 with a bluff downstream end. Each vane side 94 of FIG. 5 is curved (e.g., convex); however, the present disclosure is not limited to such an arrangement. Referring FIG. 4, each vane side 94 and the vane trailing end 92 extend spanwise from the inner wall 80A to the outer wall 80B.

Figure 6:
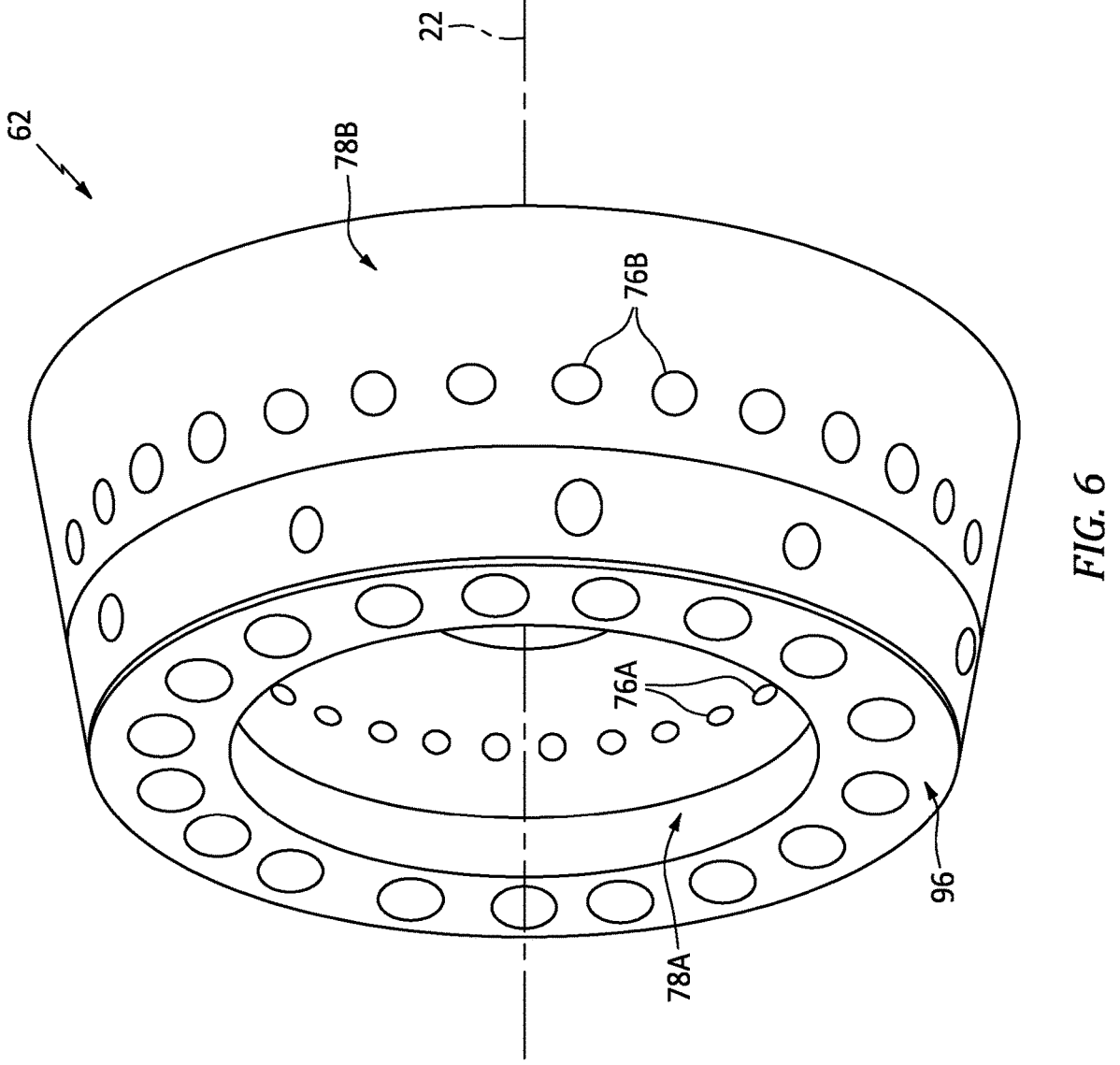
FIG. 6 is a perspective illustration of a combustor.

Referring to FIG. 2, the combustor 62 may be configured as an annular combustor; e.g., an annular floating wall combustor. The combustor 62 of FIGS. 2 and 6, for example, includes an annular combustor bulkhead wall 96 ("bulkhead"), the tubular inner combustor wall 78A ("inner wall"), and the tubular outer combustor wall 78B ("outer wall"). The bulkhead 96 of FIG. 2 extends radially between and to the inner wall 78A and the outer wall 78B. The bulkhead 96 may be connected (e.g., mechanically fastened or otherwise attached) to the inner wall 78A and/or the outer wall 78B. Each combustor wall 78 projects axially along the axial centerline 22 out from the bulkhead 96 towards the HPT section 31A. The inner wall 78A of FIG. 2, for example, projects axially to and may be connected to an (e.g., tubular) inner platform 98A of a downstream turbine vane array 100 in the HPT section 31A. The outer wall 78B of FIG. 2 projects axially to and may be connected to an (e.g., tubular) outer platform 98B of the turbine vane array 100. With the arrangement of FIG. 2, the combustion chamber 60 is formed by and extends radially within the combustor 62 between and to the inner wall 78A and the outer wall 78B. The combustion chamber 60 is formed by and extends axially (in an upstream direction along the core flowpath 52) into the combustor 62 from the turbine vane array 100 to the bulkhead 96. The combustion chamber 60 also extends within the combustor 62 circumferentially about (e.g., completely around) the axial centerline 22, which may configure the combustion chamber 60 as a full-hoop annulus.

Figure 7:
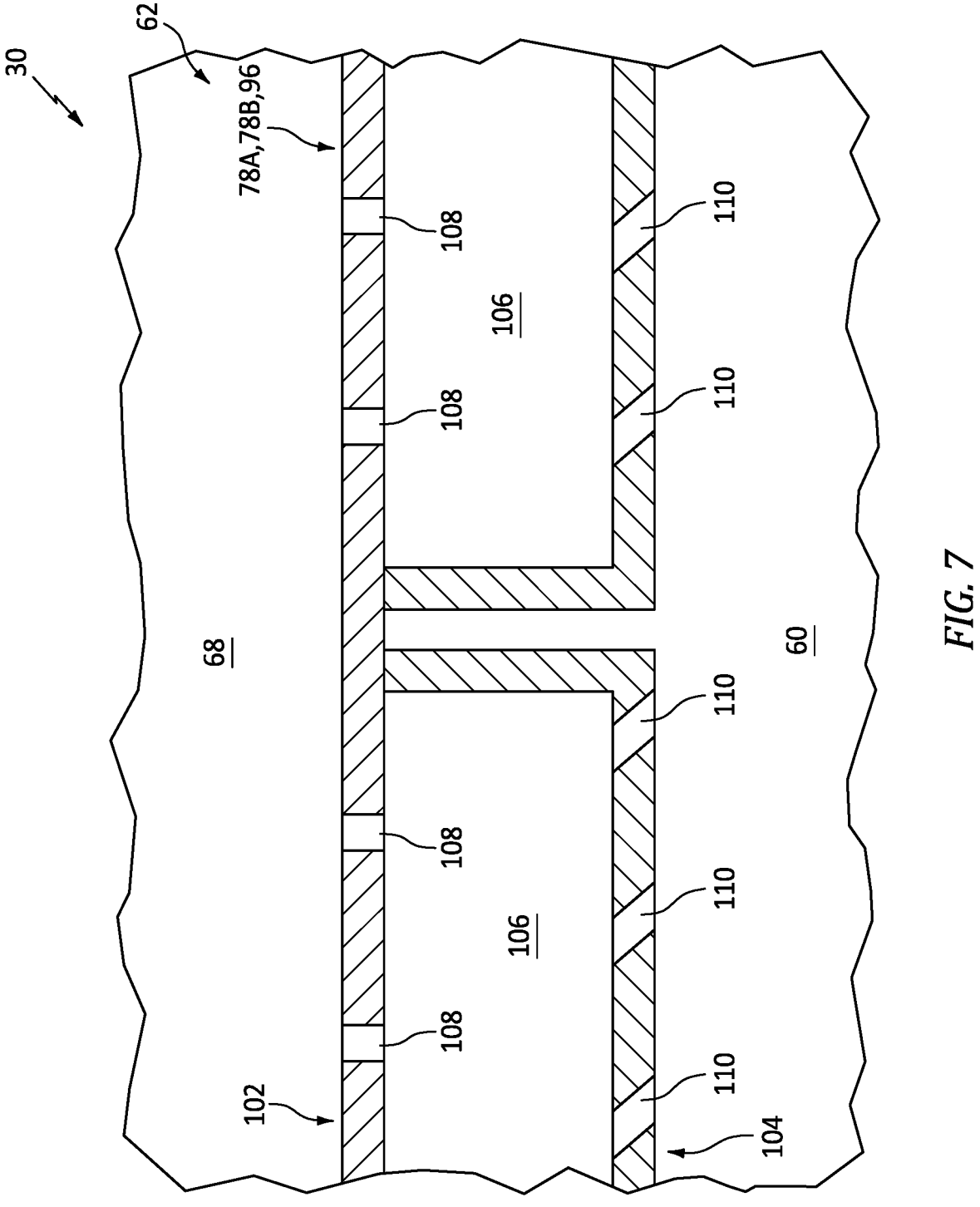
FIG. 7 is a partial sectional illustration of a combustor wall.

Referring to FIG. 7, any one or more or all of the walls 78A, 78B and/or 96 may each be configured as a multi-walled structure; e.g., a hollow, dual-walled structure. Each wall 78A, 78B, 96 of FIG. 7, for example, includes a combustor wall shell 102, a combustor wall heat shield 104 (e.g., a liner) and one or more combustor wall cooling cavities 106 (e.g., impingement cavities) formed by and (e.g., radially and/or axially) between the shell 102 and the heat shield 104. Each cooling cavity 106 of FIG. 7 is fluidly coupled with the diffuser plenum 68 through one or more cooling apertures 108 in the shell 102; e.g., impingement apertures. Each cooling cavity 106 of FIG. 7 is fluidly coupled with the combustion chamber 60 through one or more cooling apertures 110 in the heat shield 104; e.g., effusion apertures. Of course, various other multi-walled combustor wall structures are known in the art, and the present disclosure is not limited to any particular ones thereof. Furthermore, it is contemplated any one or more or all of the walls 78A, 78B and/or 96 of FIG. 2 may each alternatively be configured as a single-walled structure. The shell 102 of FIG. 7, for example, may be omitted and the heat shield 104 may form a single walled liner/wall. However, for ease of description, each wall 78A, 78B, 96 may each be described below as the hollow, dual-walled structure.

Referring to FIG. 2, the turbine vane array 100 includes the inner platform 98A, the outer platform 98B and a plurality of turbine vanes 112. The turbine vanes 112 are arranged circumferentially about the axial centerline 22 in an array; e.g., a circular array. Each of these turbine vanes 112 extends radially across the core flowpath 52 between and to the inner platform 98A and the outer platform 98B. Each of the turbine vanes 112 may also be connected to the inner platform 98A and/or the outer platform 98B. The turbine vane array 100 and its turbine vanes 112 are configured to turn and/or otherwise condition the combustion products exiting the combustion chamber 60 for interaction with a first stage of the HPT rotor 41 (see FIG. 1).

Figure 8:
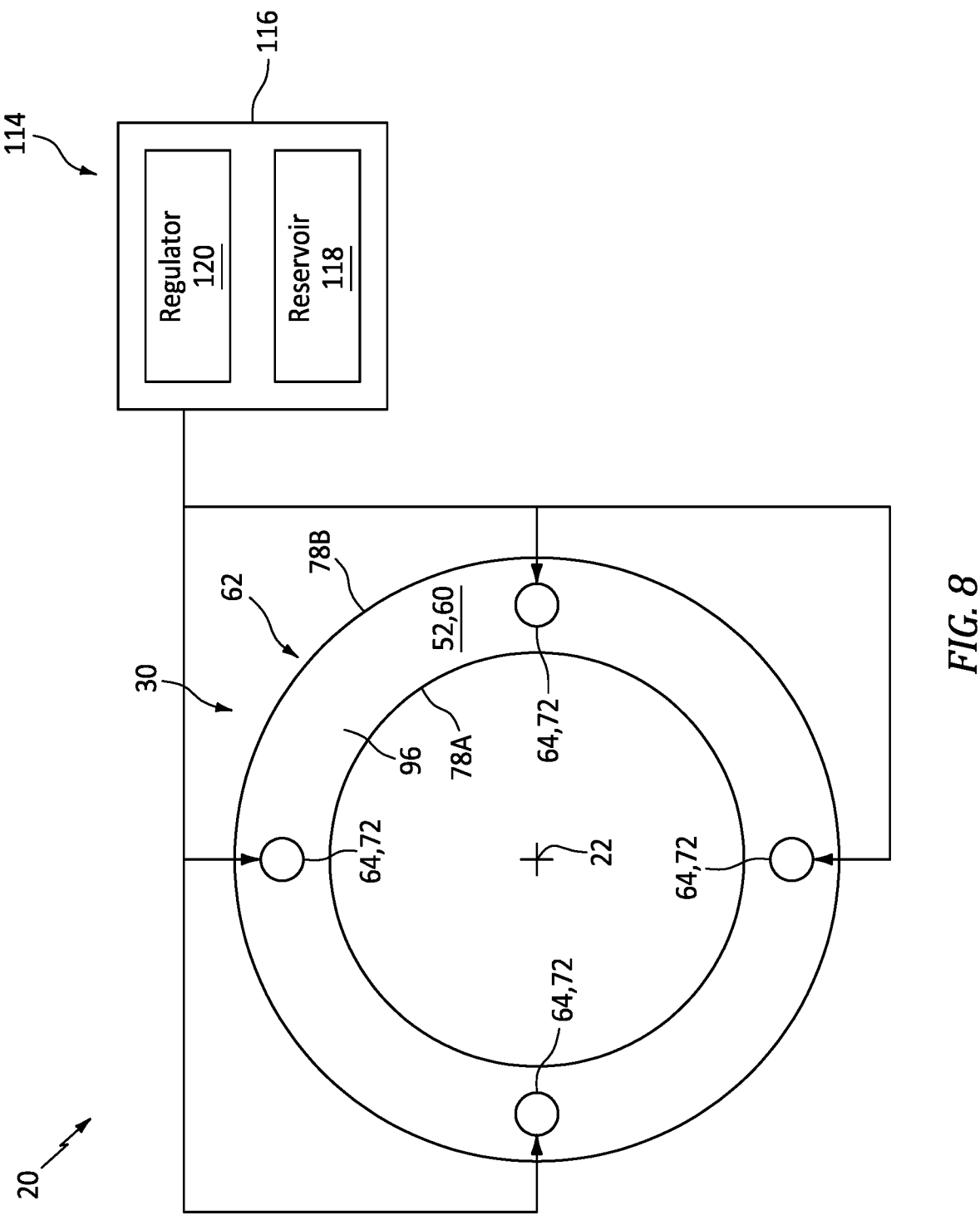
FIG. 8 is a schematic illustration of a fuel system configured with the combustor section.

Referring to FIG. 8, the turbine engine 20 includes a fuel system 114 for delivering the fuel to the combustor 62. This fuel system 114 includes a fuel source 116 and the one or more fuel injectors 72. The fuel source 116 of FIG. 8 includes a fuel reservoir 118 and/or a fuel flow regulator 120; e.g., a valve and/or a pump. The fuel reservoir 118 is configured to store the fuel before, during and/or after turbine engine operation. The fuel reservoir 118, for example, may be configured as or otherwise include a tank, a cylinder, a pressure vessel, a bladder or any other type of fuel storage container. The fuel flow regulator 120 is configured to direct and/or meter a flow of the fuel from the fuel reservoir 118 to one or more or all of the fuel injectors 72. The fuel injectors 72 may be arranged circumferentially about the axial centerline 22 in an array. Each fuel injector 72 is configured to direct the fuel received from the fuel source 116 into the combustion chamber 60 for combustion.

The fuel delivered by the fuel system 114 may be a non-hydrocarbon fuel; e.g., a hydrocarbon free fuel. Examples of the non-hydrocarbon fuel include, but are not limited to, hydrogen fuel (e.g., hydrogen ($H_2$) gas) and ammonia fuel (e.g., ammonia ($NH_3$) gas). The turbine engine 20 of FIG. 1 may thereby be configured as a non-hydrocarbon turbine engine; e.g., a hydrocarbon free turbine engine. The present disclosure, however, is not limited to non-hydrocarbon turbine engines. The fuel delivered by the fuel system 114, for example, may alternatively be a hydrocarbon fuel such as, but not limited to, kerosene or jet fuel. The turbine engine 20 of FIG. 1 may thereby be configured as a hydrocarbon turbine engine. Alternatively, the fuel system 114 may be configured as a multi-fuel system operable to deliver, individually or in combination, multiple different fuels (e.g., a non-hydrocarbon fuel and a hydrocarbon fuel, etc.) for combustion within the combustion chamber 60. The turbine engine 20 of FIG. 1 may thereby be configured as a multi-fuel turbine engine; e.g., a dual-fuel turbine engine.

Figure 9:
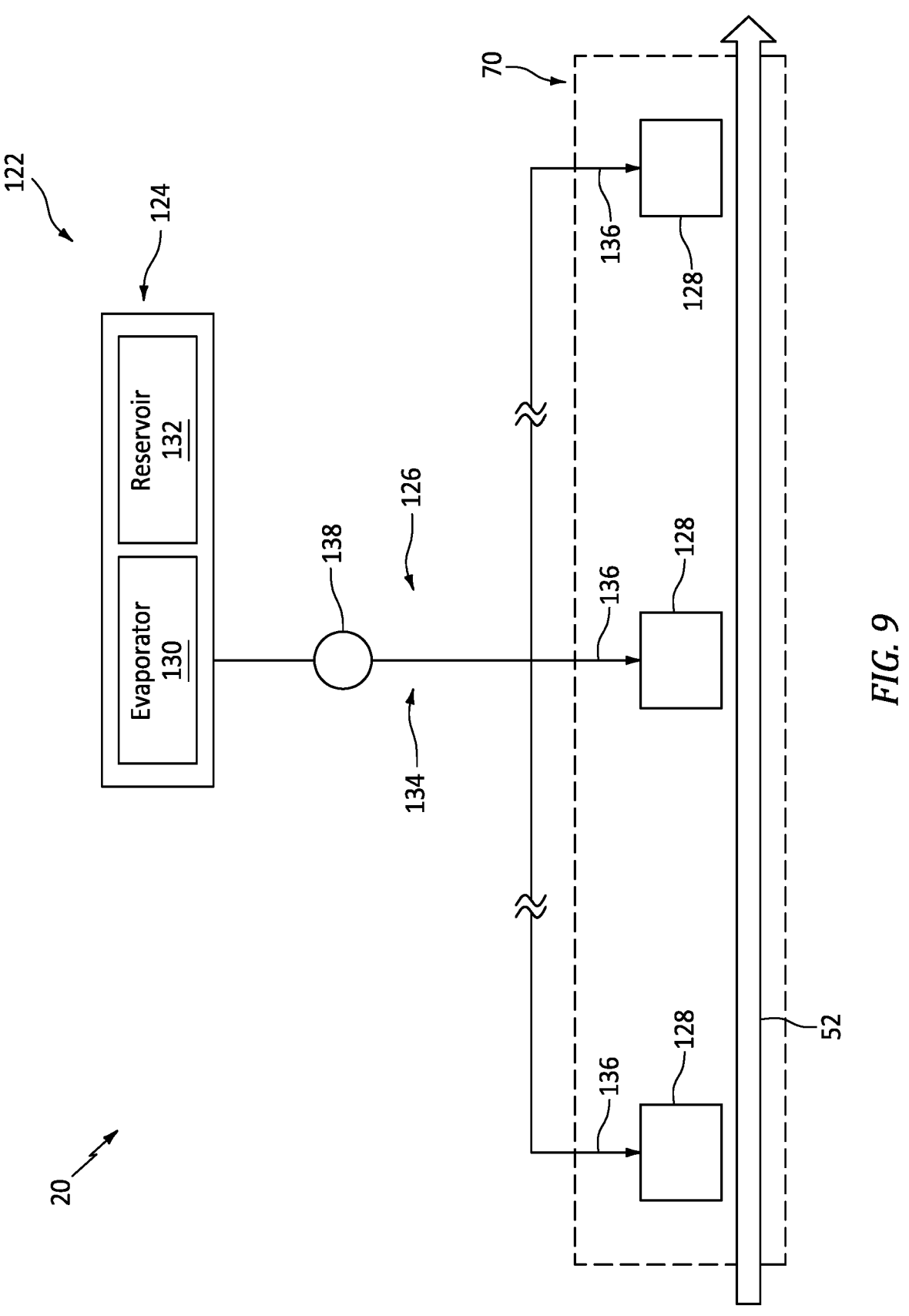
FIG. 9 is a partial schematic illustration of a steam system arranged with the stator vane array.

Referring to FIG. 9, the turbine engine 20 includes a steam system 122 for selectively delivering steam to core flowpath 52 upstream of the combustor 62 (see FIG. 2). The steam system 122 of FIG. 9 includes a steam source 124, a steam delivery circuit 126 and one or more steam injectors 128 (see FIG. 2). Briefly, the steam injectors 128 are arranged with the core flowpath 52 upstream of the diffuser plenum 68. The steam injectors 128 of FIG. 9, for example, are configured with the vane array structure 70; e.g., see also FIGS. 2, 4, 5, 10 and 11. With this arrangement, referring to FIG. 2, the steam system 122 introduces steam into core flowpath 52 with the compressed core air. The steam may mix with the core air, and this mixture of core air and steam ("air-steam mixture") may be directed into the combustion chamber 60 as described above. The steam may thereby broadly enhance air cooling of the combustor 62 as well as reduce a temperature of the combustion products flowing within the combustion chamber 60 and into the turbine vane array 100. Reducing the combustion products temperature may reduce thermal stresses on components contacting the combustion products. Reducing the combustion products temperature may also facilitate a reduction of nitrogen oxide (NOx) production/formation in the combustion products.

Referring to FIG. 9, the steam source 124 is configured to provide the steam to the steam delivery circuit 126 during turbine engine operation and, more particularly, during steam system operation. The steam source 124, for example, may be configured as or otherwise include an evaporator 130, which may be or otherwise include a fluid-to-fluid heat exchanger and/or an electrical heater. The evaporator 130 is configured to evaporate water into the steam during steam system operation. The water may be received from various sources. The steam source 124 of FIG. 9, for example, includes a water reservoir 132 fluidly coupled with and upstream of the evaporator 130. This water reservoir 132 is configured to store the water before, during and/or after turbine engine operation. Examples of the water reservoir 132 include, but are not limited to, a tank, a cylinder, a pressure vessel, a bladder or any other type of water storage container. Briefly, the water may be supplied to the water reservoir 132 by recovering water vapor from the combustion products flowing through the core flowpath 52 (see FIG. 1) and/or from another water source onboard or offboard an aircraft.

The steam delivery circuit 126 of FIG. 9 includes a supply circuit 134 and one or more feed circuits 136, where each feed circuit 136 is associated with a respective one of the steam injectors 128. The supply circuit 134 of FIG. 9 extends from an outlet from the steam source 124 to an interface with the feed circuits 136 such as a manifold. At the interface, the feed circuits 136 may be fluidly coupled in parallel to and downstream of the supply circuit 134. Each of the feed circuits 136 extends from the interface to an inlet of a respective one of the steam injectors 128. The steam delivery circuit 126 thereby fluidly couples the steam source 124 to the respective steam injectors 128.

The steam directed through the steam delivery circuit 126 may be regulated based on the combustion process within the combustion chamber 60 and/or based on a mode of turbine engine operation. The steam delivery circuit 126 of FIG. 9, for example, includes a steam flow regulator 138. The steam flow regulator 138 is arranged (e.g., fluidly coupled inline) with the supply circuit 134. The steam flow regulator 138 is configured to selectively direct and/or meter a flow of the steam from the steam source 124 to the steam injectors 128. For example, the steam flow regulator 138 may be configured as or otherwise include a control valve. This control valve may fully open, may fully close and/or may move to one or more partially open positions. While the steam flow regulator 138 is illustrated in FIG. 9 as being part of the supply circuit 134, that steam flow regulator 138 may alternatively be arranged at the interface between the supply circuit 134 and the feed circuits 136, at an inlet to the supply circuit 134, or otherwise. One or more or all of the feed circuits 136 may also or alternatively be provided with its own steam flow regulator. Furthermore, it is contemplated the steam delivered to one or more or all of the steam injectors 128 may still also or alternatively be regulated by adjusting an amount of steam provided (e.g., produced) by the steam source 124.

Referring to FIGS. 4 and 5, each steam injector 128 may be configured as part of a respective one of the stator vanes 82. The stator vane 82 of FIGS. 4 and 5, for example, includes an internal steam passage 140 and one or more steam outlets 142, 144A and 144B.

Referring to FIG. 4, the steam passage 140 is fluidly coupled with and downstream of a respective one of the feed circuits 136. This steam passage 140 extends spanwise within the respective stator vane 82. Referring to FIG. 5, the steam passage 140 extends longitudinally within the respective stator vane 82 between opposing longitudinal sides 146A and 146B of the steam passage 140. The steam passage 140 extends laterally within the respective stator vane 82 between opposing lateral sides 148A and 148B of the steam passage 140.

Each of the steam outlets 142, 144A, 144B projects through a sidewall of the respective stator vane 82 from the steam passage 140 to the core flowpath 52. Each of the steam outlets 142, 144A, 144B thereby fluidly couples the steam passage 140 to the core flowpath 52. One or more of the steam outlets 142 may be arranged at the vane trailing end 92. The steam outlets 142 of FIGS. 4 and 5, for example, may be arranged laterally and/or spanwise along the vane trailing end 92 in one or more arrays. One or more of the steam outlets 144A may be arranged at the first vane side 94A. The steam outlets 144A of FIGS. 4 and 5, for example, may be arranged longitudinally and/or spanwise along the first vane side 94A. Similarly, one or more of the steam outlets 144B may be arranged at the second vane side 94B. The steam outlets 144B, for example, may be arranged longitudinally and/or spanwise along the second vane side

94B. In addition to introducing the steam into the core flowpath 52, the steam outlets 144A and 144B (generally referred to as "144") may also re-energize boundary layer core air.

While the steam outlets 142 and 144 may be arranged at and along the vane trailing end 92 and the vane sides 94, the present disclosure is not limited to such an arrangement. For example, the steam outlets 144A, 144B at one of the vane sides 94A, 94B may be omitted. In addition or alternatively, the steam outlets 142 at the vane trailing end 92 may be omitted. In another example, the steam outlets 144 at both vane sides 94 may be omitted.

In some embodiments, one or more or all of the stator vanes 82 may each also include at least (or only) one additional internal passage 150. This second passage 150 may extend radially through the vane array structure 70 and the respective stator vane 82. The second passage 150 of FIGS. 4 and 5 is arranged longitudinally between the vane leading end 90 and the steam passage 140. This second passage 150 is fluidly decoupled from the steam passage 140 within the vane array structure 70 and its respective stator vane 82. Examples of the second passage 150 include, but are not limited to, a lubricant passage and a cooling air passage.

Figure 10:
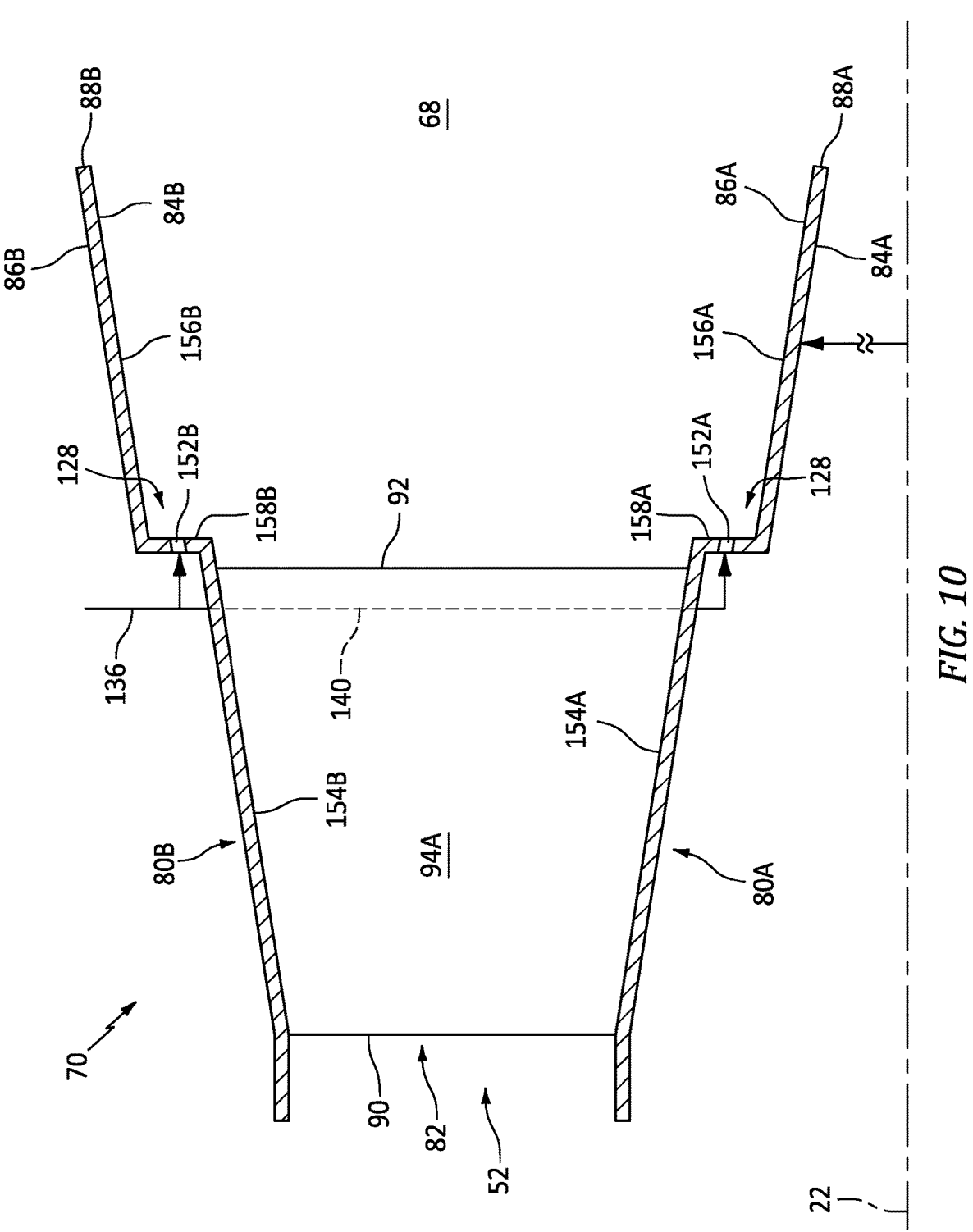
FIG. 10 is a partial schematic illustration of the stator vane array configured with another steam injector.
Figure 11:
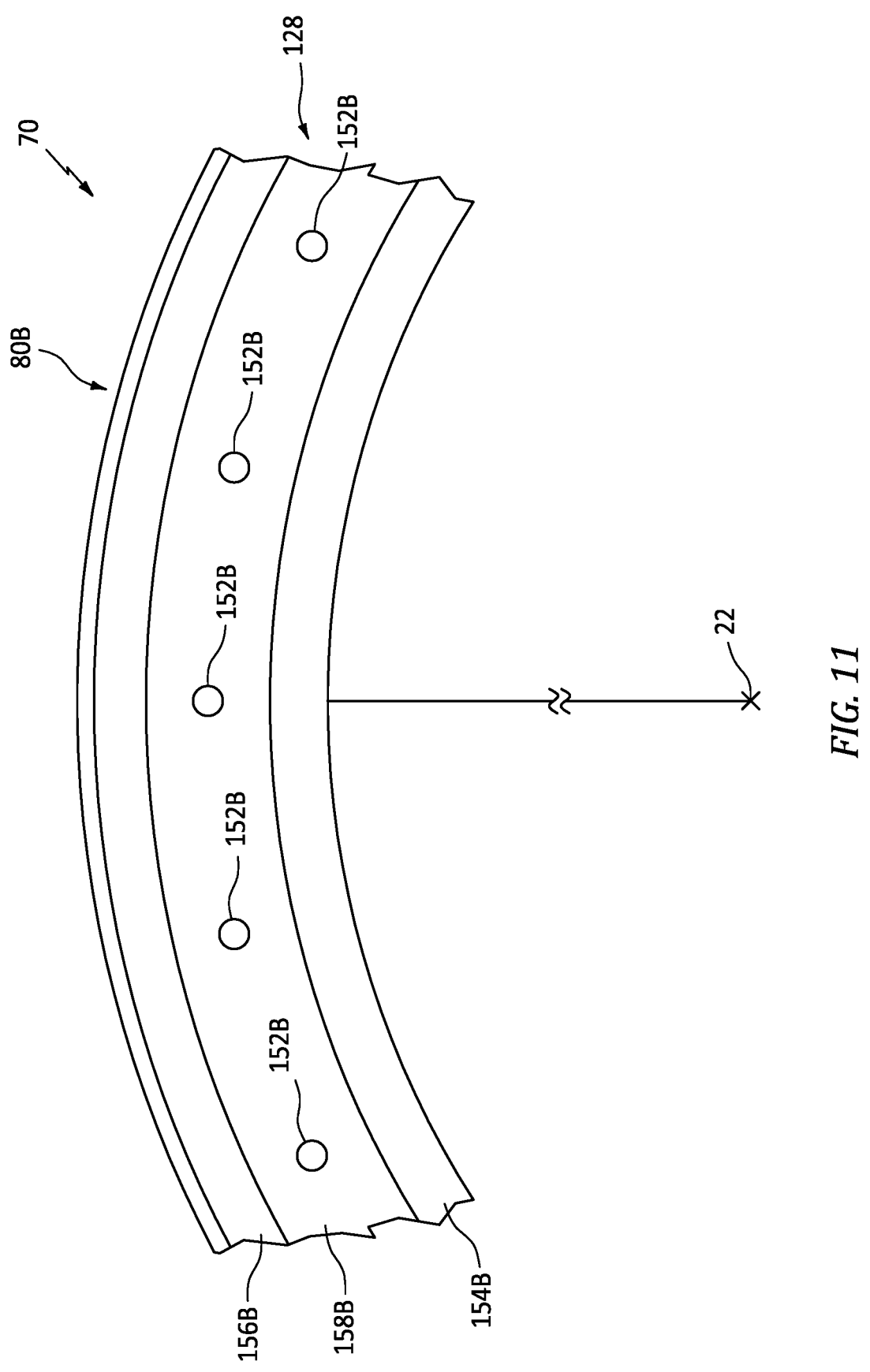
FIG. 11 is a partial illustration of an outer flowpath wall of the stator vane array and the steam injector of FIG. 10.

Referring to FIGS. 10 and 11, one or more of steam outlets 152A and 152B (generally referred to as "152") may also or alternatively be arranged at one or both of the flowpath walls 80A and/or 80B (generally referred to as "80"). Each flowpath wall 80A, 80B of FIG. 10, for example, includes a (e.g., tubular) upstream section 154A, 154B (generally referred to as "154"), a (e.g., tubular) downstream section 156A, 156B (generally referred to as "156") and an (e.g., annular) intermediate section 158A, 158B (generally referred to as "158"). The upstream section 154 extends longitudinally along the core flowpath 52 (in a downstream direction) to an interior end of the intermediate section 158. The downstream section 156 extends longitudinally along the core flowpath 52 (in the upstream direction) to an exterior end of the intermediate section 158. The intermediate section 158 extends radially between and to the upstream section 154 and the downstream section 156. Each of the steam outlets 152 projects through a respective intermediate section 158 from the steam passage 140 to the core flowpath 52. Referring to FIG. 11, at each intermediate section 158, the steam outlets 152 may be arranged circumferentially about the axial centerline 22 in an array; e.g., a circular array. The steam outlets 152 of FIG. 10 may thereby inject the steam into the core flowpath 52 longitudinally along the respective downstream section 156.

Figure 12A:
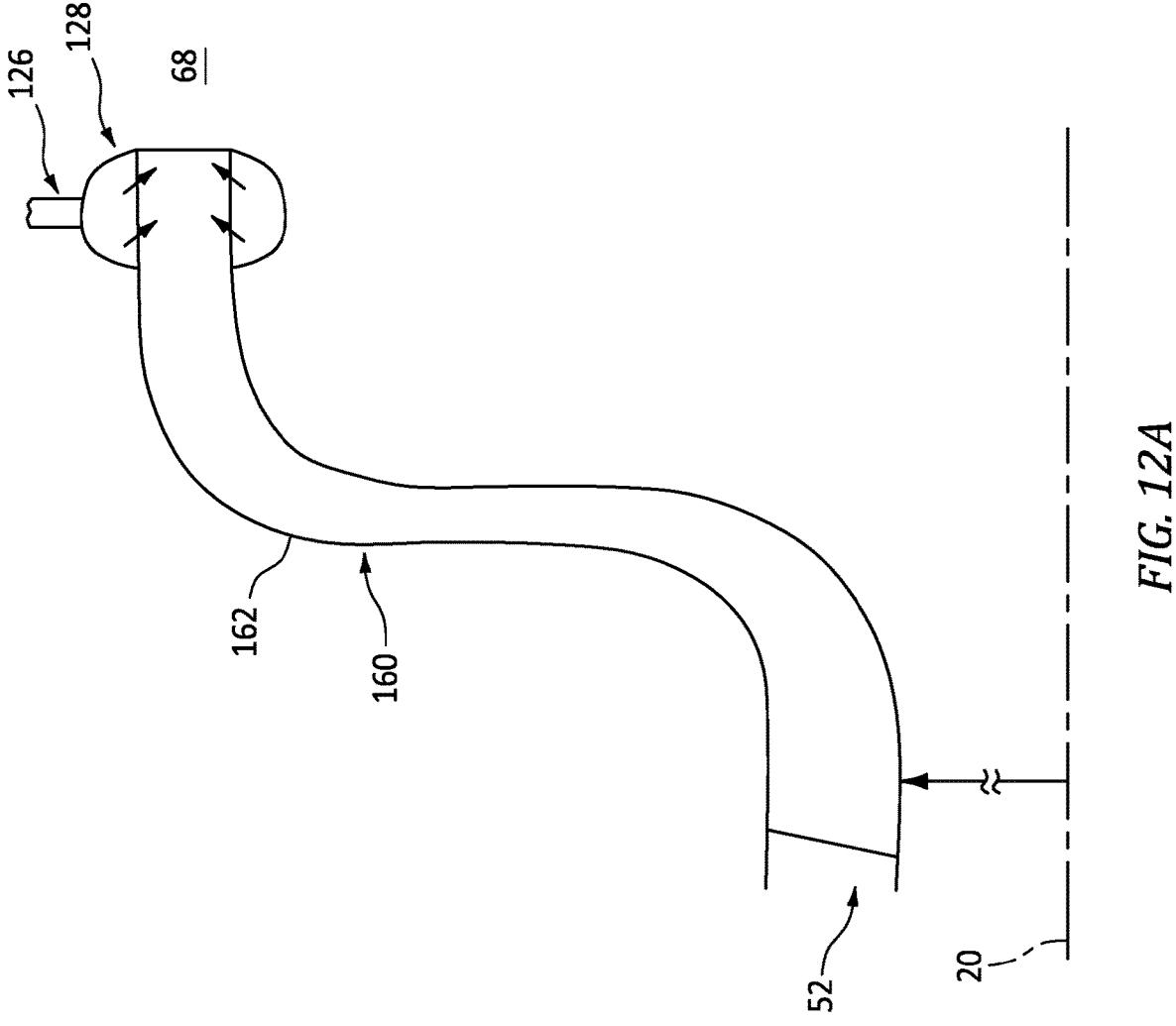
FIGS. 12A-C are partial schematic illustrations of a pre-diffuser tube configured with various arrangements of the steam system.
Figure 12B:
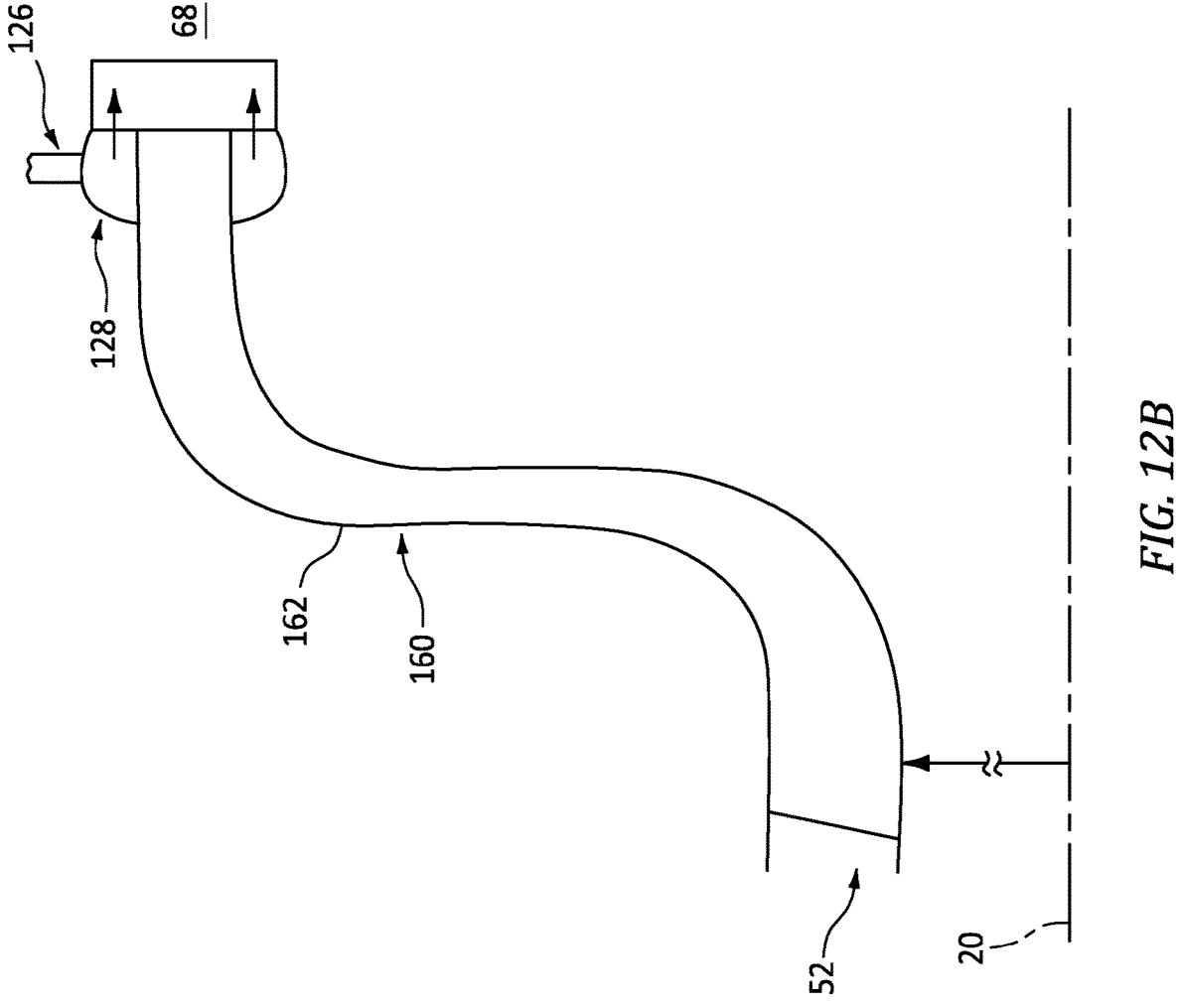
Figure 12C:
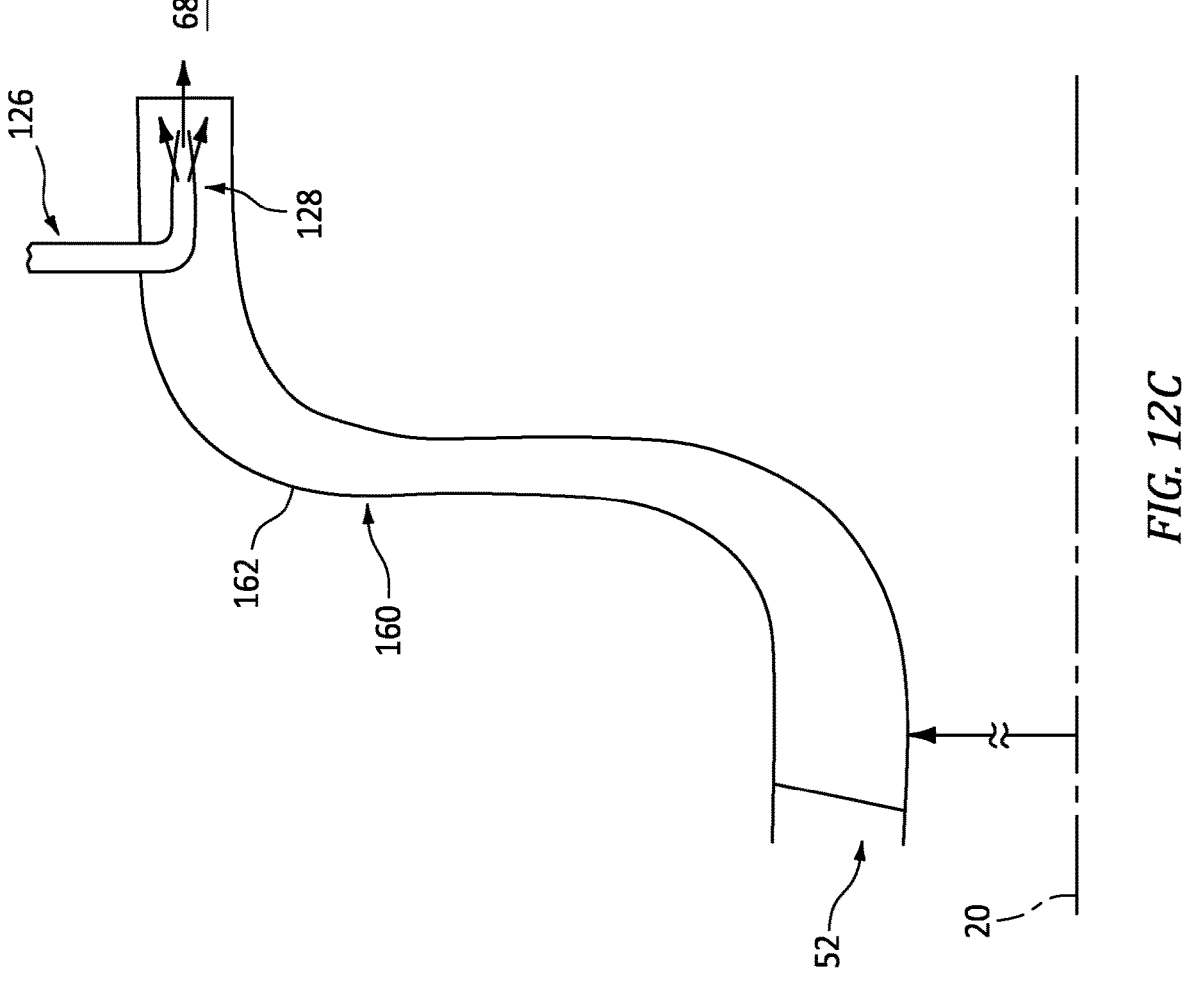

The steam may be introduced into an annular portion of the core flowpath 52 as described above. It is contemplated, however, the vane array structure 70 described above may be replaced with one or more pre-diffuser tubes arranged circumferentially about the axial centerline 22. Examples of such pre-diffuser tubes are disclosed in U.S. Pat. Nos. 6,589,015 and 3,333,762, both of which are incorporated herein by reference in their entirety. With such an arrangement, for example referring to FIGS. 12A-C, the steam may be introduced into one, some or all of the pre-diffuser tubes (e.g., 160) through a respective stator vane and/or flowpath wall (e.g., one or more sides of a pre-diffuser tube wall 162) as described above. Moreover, it is further contemplated the steam may be introduced into the core flowpath just upstream of such pre-diffuser tubes. The present disclosure therefore is not limited to the annular configurations described above.

The steam system 122 may be included in various turbine engines other than the one described above. The steam system 122, for example, may be included in a geared turbine engine where a geartrain connects one or more shafts to one or more rotors in a fan section, a compressor section and/or any other engine section. Alternatively, the steam system 122 may be included in a turbine engine configured without a geartrain; e.g., a direct drive turbine engine. The steam system 122 may be included in a geared or non-geared turbine engine configured with a single spool, with two spools (e.g., see FIG. 1), or with more than two spools. The turbine engine may be configured as a turbofan engine, a turbojet engine, a turboprop engine, a turboshaft engine, a propfan engine, a pusher fan engine or any other type of turbine engine. The engine core 37 therefore may power various types of propulsor rotor other than the exemplary fan rotor 38 described above. Moreover, it is contemplated the turbine engine may alternatively be configured as an auxiliary power unit (APU) or an industrial gas turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An aircraft propulsion system, comprising:
a propulsor rotor;
a turbine engine core configured to power the propulsor rotor, the turbine engine core comprising:
a core flowpath,
a compressor section,
a combustor section and
a turbine section,
the core flowpath extending through the compressor section, the combustor section and the turbine section from a flowpath inlet to a flowpath exhaust,
the compressor section comprising:
a low pressure compressor section and a high pressure compressor section,
the low pressure compressor section comprising: a low pressure compressor rotor and
the high pressure compressor section comprising; a high pressure compressor rotor,
the combustor section comprising:
an injector assembly,
a diffuser plenum and a combustor disposed within the diffuser plenum, the injector assembly comprising: a fuel injector and a swirler mated with the fuel injector, the fuel injector configured to inject fuel into a combustion chamber of the combustor, and the swirler configured to direct air received from the diffuser plenum into the combustion chamber of the combustor to facilitate mixing of the air with the fuel; and a steam system configured to introduce steam from an evaporator into the core flowpath downstream of the compressor section and upstream of the diffuser plenum between the high pressure compressor section and the diffuser plenum, at an inlet into the diffuser plenum,
wherein the turbine engine core further includes a pre-diffuser structure comprising; an inner wall and an outer wall, the core flowpath extends through the pre-diffuser structure to the diffuser plenum: wherein at least one of the inner wall or the outer wall comprises a first section and a second section extending mainly axially, and an intermediate section extending mainly radially from an interior end connected to the first section to an exterior end connected to the second section, and wherein the steam system comprises a first steam outlet on the intermediate section, and the steam system is configured to introduce the steam into the core flowpath through the first steam outlet.

2. The aircraft propulsion system of claim 1, wherein the pre-diffuser structure includes a plurality of vanes arranged circumferentially about a centerline, each of the plurality of vanes extends across the core flowpath, and the plurality of vanes comprise a first vane; and the steam system comprises a first second steam outlet configured with the first vane, and the steam system is configured to introduce the steam into the core flowpath through the first second steam outlet.

3. The aircraft propulsion system of claim 2, wherein the first vane extends longitudinally between a leading end and a trailing end, and the first vane extends laterally between a first side and a second side; and the first-second steam outlet is arranged at the trailing end.

4. The aircraft propulsion system of claim 3, wherein the steam system further comprises a third steam outlet arranged at the trailing end, and the steam system is configured to further introduce the steam into the core flowpath through the third steam outlet.

5. The aircraft propulsion system of claim 3, wherein the steam system further comprises a third steam outlet arranged along the first side, and the steam system is configured to further introduce the steam into the core flowpath through the third steam outlet.

6. The aircraft propulsion system of claim 5, wherein the steam system further comprises a fourth steam outlet arranged along the second side, and the steam system is configured to further introduce the steam into the core flowpath through the fourth steam outlet.

7. The aircraft propulsion system of claim 2, wherein the first vane extends longitudinally between a leading end and a trailing end, and the first vane extends laterally between a first side and a second side; and the second steam outlet is arranged at the first side.

8. The aircraft propulsion system of claim 7, wherein the steam system further comprises a third steam outlet arranged at the first side, and the steam system is configured to further introduce the steam into the core flowpath through the second third steam outlet.

9. The aircraft propulsion system of claim 7, wherein the steam system further comprises a third steam outlet arranged at the second side, and the steam system is configured to further introduce the steam into the core flowpath through the third steam outlet.

10. The aircraft propulsion system of claim 2, wherein each of the plurality of vanes extends radially between and is connected to the inner wall and the outer wall; and

the inner wall forms an inner peripheral boundary of the core flowpath through the pre- diffuser structure, the outer wall forms an outer peripheral boundary of the core flowpath through the pre-diffuser structure, and the core flowpath radially expands as the core flowpath extends within the pre-diffuser structure towards the diffuser plenum.

11. The aircraft propulsion system of claim 2, wherein the steam system further comprises a steam passage extending within the first vane; and the second steam outlet extends through a sidewall of the first vane from the steam passage to the core flowpath.

12. The aircraft propulsion system of claim 11, wherein a supplementary passage extends within the first vane; and the supplementary passage is fluidly decoupled from the steam passage.

13. The aircraft propulsion system of claim 12, wherein the supplementary passage comprises a lubricant passage or an air passage.

14. The aircraft propulsion system of claim 2, wherein the intermediate section is downstream of the first vane.

15. The aircraft propulsion system of claim 1, wherein the combustor comprises a hollow, dual-walled structure comprising:
   a combustor wall shell;
   a combustor wall heat shield; and
   one or more combustor wall cooling cavities radially formed between the combustor wall shell and the combustor wall heat shield.

16. The aircraft propulsion system of claim 15, wherein the one or more combustor wall cooling cavities comprises a first cooling cavity;
   the combustor wall shell comprises one or more impingement apertures;
   the combustor wall heat shield comprises one or more effusion apertures;
   the first cooling cavity is fluidly coupled to the diffuser plenum through the one or more impingement apertures; and
   the first cooling cavity is fluidly coupled to the combustion chamber through the one or more effusion apertures.

17. An assembly for a turbine engine, comprising:
   a turbine engine core comprising:
      a core flowpath,
      a compressor section,
      a combustor section, and
      a turbine section, the core flowpath extending through the compressor section, the combustor section and the turbine section from a flowpath inlet to a flowpath exhaust,
         the combustor section comprising:
            a diffuser plenum and
            a combustor disposed within the diffuser plenum, and
         the compressor section includingcomprising:
            a low pressure compressor section comprising:
               a low pressure compressor rotor, and a high pressure compressor section comprising: a high pressure compressor rotor,
      a vane array structure comprising:
         an inner wall,
         an outer wall, the core flowpath extending through the vane array structure towards the diffuser plenum, at least one of the inner wall or the outer wall comprising; a first section and a second section extending mainly axially, and an intermediate section extending mainly radially from an interior end connected to the first section to an exterior end connected to the second section, and
         a plurality of vanes arranged circumferentially about a centerline, each vane of the plurality of vanes extending across the core flowpath, the plurality of vanes comprising:
            a first vane, the first vane extending longitudinally between a leading end and a trailing end, and the first vane extending laterally between a first side and a second side; and
   a steam system comprising:
      a steam source having an evaporator,
      a first steam outlet on the intermediate section, and
      a second steam outlet arranged along the first side of the first vane, the steam system
      configured to inject steam from the evaporator into the core flowpath downstream of the compressor section, upstream of the diffuser plenum between the high pressure compressor section and the diffuser plenum, at an inlet into the diffuser plenum, and through the first steam outlet and the second steam outlet.

18. The assembly of claim 17, wherein the steam system further comprises a third steam outlet arranged along the second side of the first vane, and the steam system is configured to further inject the steam into the core flowpath through the third steam outlet.

19. An assembly for a turbine engine, comprising:
   a turbine engine core including:
      a compressor section,
      a combustor section,
      a turbine section and
      a core flowpath,
         the combustor section including:
            a fuel injector,
            a diffuser plenum, and
            a combustor disposed within the diffuser plenum, and
         the compressor section including:
            a low pressure compressor section comprising:
               a low pressure compressor rotor, and
               a high pressure compressor section comprising:
               a high pressure compressor rotor, the fuel injector configured to inject fuel into a combustion chamber of the combustor, and the core flowpath extending through the compressor section, the combustor section and the turbine section from a flowpath inlet to a flowpath exhaust;
   a peripheral boundary of the core flowpath upstream of the diffuser plenum formed by a flowpath wall, the flowpath wall extending circumferentially about and axially along a centerline, the flowpath wall comprising:
      a first section,
      a second section, and
      an intermediate section extending mainly radially from an interior end connected to the first section to an exterior end connected to the second section, the first section extending mainly axially to the intermediate section, and the second section extending mainly axially from the intermediate section; and
   a steam system comprising:
      an evaporator, and
      a plurality of steam outlets on the intermediate section, the steam system configured to inject steam from the evaporator into the core flowpath downstream of the compressor section and upstream of the diffuser plenum and the fuel injector, between the high pressure compressor section and the diffuser plenum, at an inlet into the diffuser plenum, and through the plurality of steam outlets.

\* \* \* \* \*